R. C. BLACKMAN.
ATTACHMENT FOR MOTOR CYCLES.
APPLICATION FILED FEB. 10, 1911.

1,004,975.

Patented Oct. 3, 1911.

3 SHEETS—SHEET 1.

Witnesses.
B. R. Carr
C. T. Jackson

Inventor.
R. Chester Blackman
By Bromhardt & Co.
Attorneys

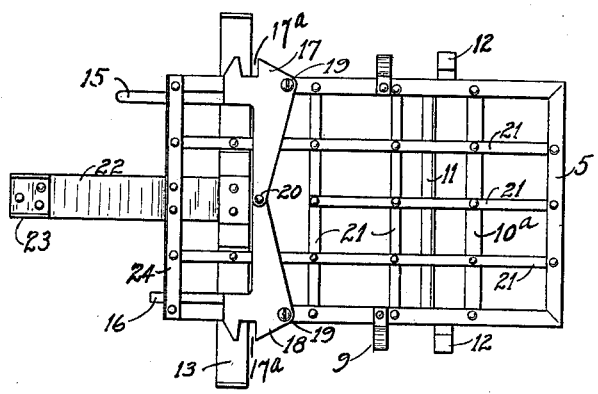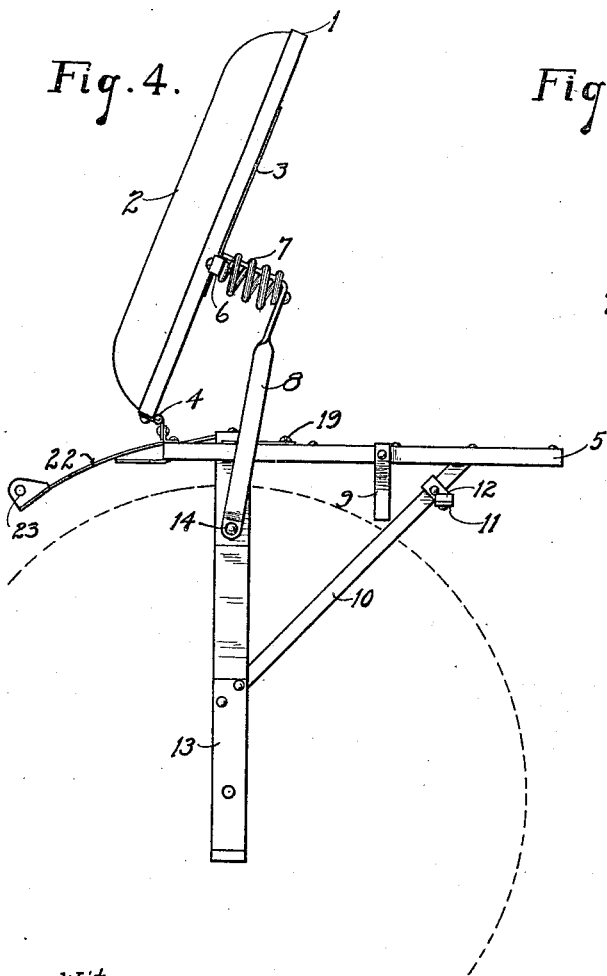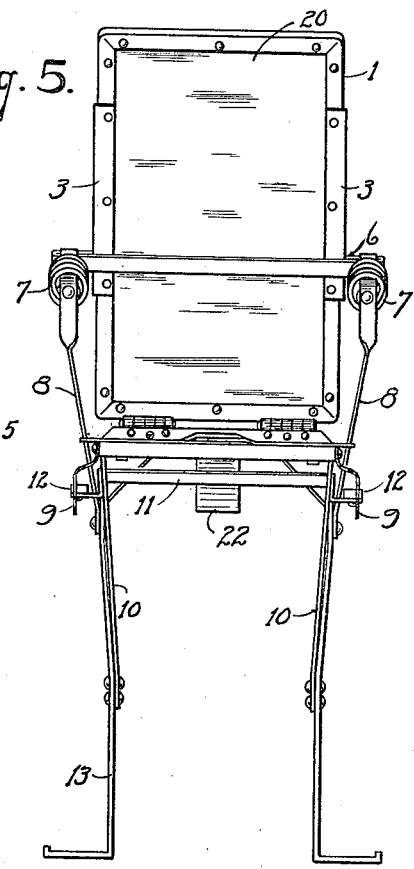

R. C. BLACKMAN.
ATTACHMENT FOR MOTOR CYCLES.
APPLICATION FILED FEB. 10, 1911.
1,004,975.
Patented Oct. 3, 1911.
3 SHEETS—SHEET 3.
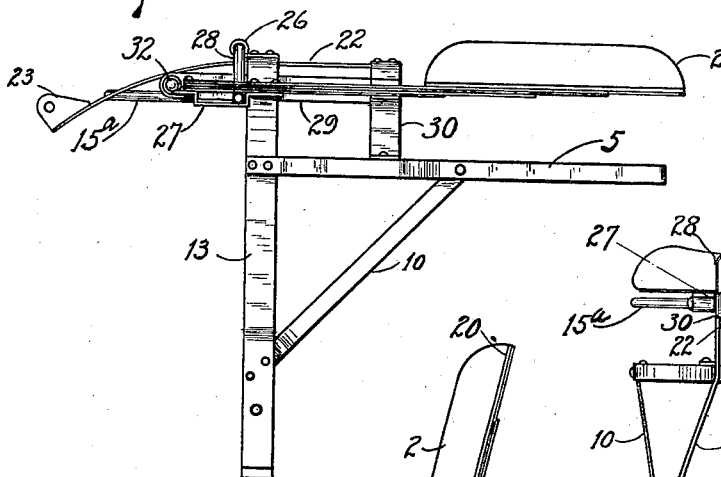
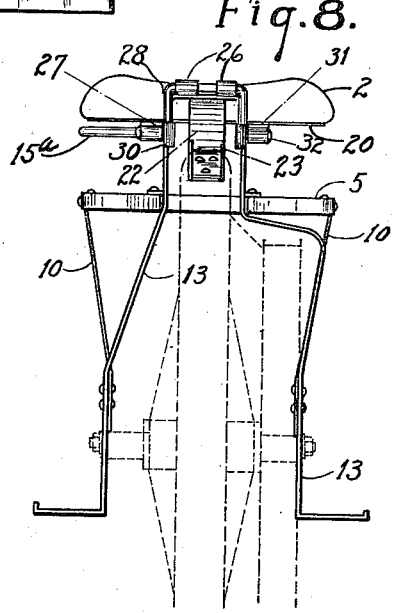
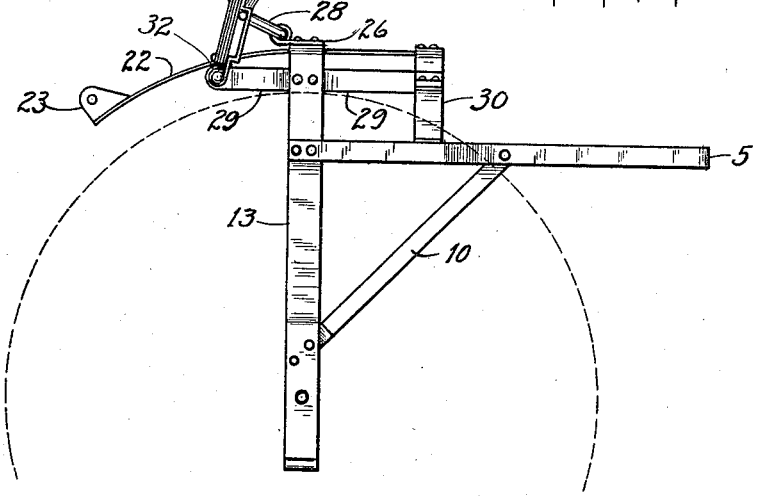
Witnesses.
B. R. Carr.
Omar H. Blackman.
Inventor.
R. Chester Blackman
By Bonnhardt & Co.
Attorneys

UNITED STATES PATENT OFFICE.

ROY CHESTER BLACKMAN, OF WEST PARK, OHIO.

ATTACHMENT FOR MOTOR-CYCLES.

1,004,975.  Specification of Letters Patent. Patented Oct. 3, 1911.

Application filed February 10, 1911. Serial No. 607,858.

*To all whom it may concern:*

Be it known that I, ROY CHESTER BLACKMAN, citizen of the United States, residing at West Park, in the county of Cuyahoga and State of Ohio, have invented certain new and useful Improvements in Attachments for Motor-Cycles, of which the following is a specification.

This invention is a combination back, rear seat, and luggage carrier particularly adapted and intended for use on motor bicycles.

The object of the invention is to provide a device which can be used as a rear or auxiliary seat, or as a back for the ordinary seat, or as a luggage carrier, on a motor-cycle, as will more fully appear from the following description and the accompanying drawings.

Figure 2:
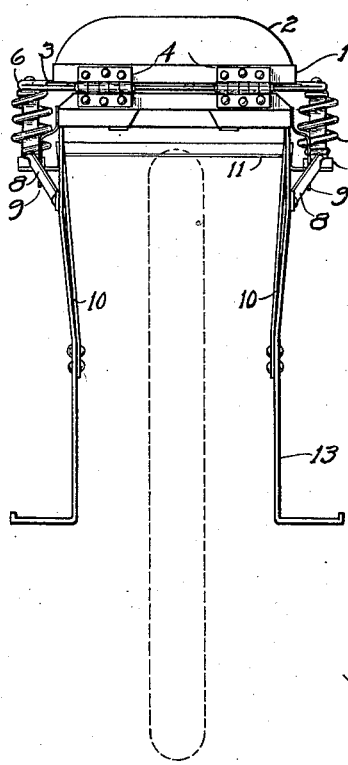
Figure 1:
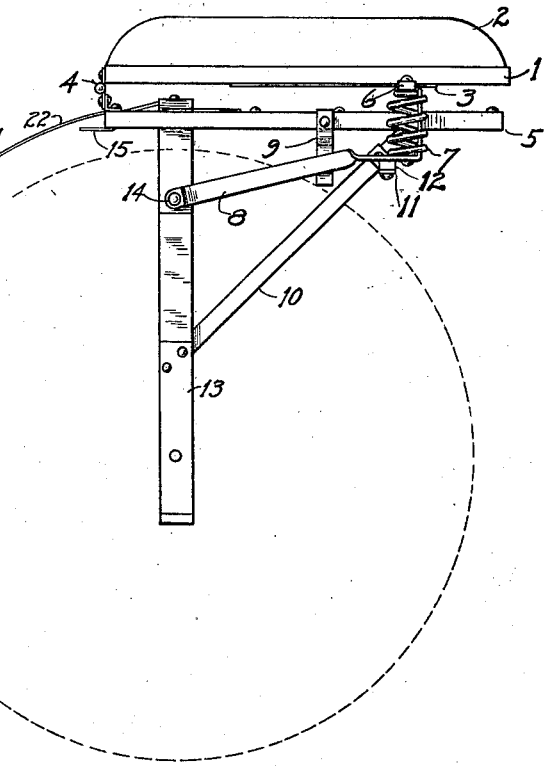
Figure 3:
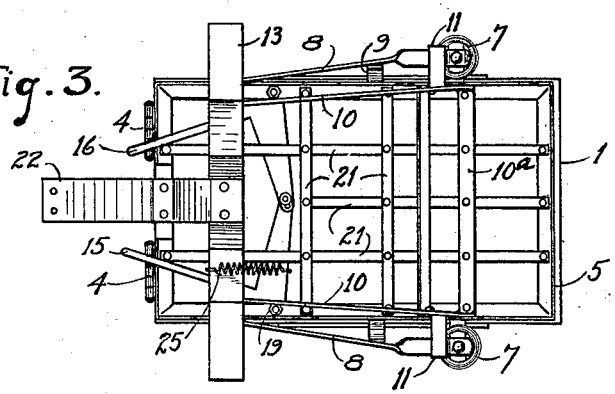

In the drawings—Figure 1 is a side elevation of the device. Fig. 2 is a rear end view. Fig. 3 is an inverted bottom plan view. In these views the device is shown as a seat. Figs. 4 and 5 are side and rear elevations showing the seat in raised position. Fig. 6 is a top view of the carrier, with the seat removed. Figs. 7, 8, are respectively side and end views of a modification, the seat being down. Fig. 9 is a side view of the modification, with the seat raised to form a back.

Referring specifically to the drawings, 1 indicates the frame of the rear seat or back, with a pad 2 thereon, and metal plates 3 fastened to the underside of the frame 1. This is hinged at its front end, as indicated at 4, to the luggage carrier frame 5 which is relatively fixed and is supported by uprights 13 and braces 10 at its opposite sides, the uprights 13 being attachable to the axle of the rear wheel, by means of holes in the uprights provided for that purpose, and said uprights may be bent out at the lower ends thereof to form foot rests. The upper ends of the braces 10 are connected by a cross piece 10ª fastened to the underside of the carrier frame 5, which has cross straps or slats 21 to support a load.

The plates 3 have extended edges which form guides for slides 6 which embrace the same and are slidable back and forth thereon, these slides being connected to angular radius bars 8 which are pivoted at 14 to the uprights 13 and arranged to swing up and down with the seat 2. Springs 7 are coiled around the upstanding ends of the bars 8 and serve to cushion the seat. Brackets 11, fastened to the braces 10, and cushioned by rubber blocks 12, form stops for the bars 8, to support the seat in horizontal position, and guides 9, depending from opposite sides of the carrier frame 5, serve to guide and hold the arms 8 in proper position on said stops.

A plate 22 is connected at its rear end to the top or upper cross piece of the uprights 13, and is adapted for attachment at its front end to the rear fork of the motor cycle, directly under the ordinary seat (not shown).

When desired the seat may be swung up as shown in Fig. 4, and is supported in such position by means of a pair of detent plates 17 and 18 which are pivoted at 19 to the frame 5 and are connected at their inner ends by a pivot 20. Handles 15 and 16 project from the plates 17 and 18, and notches 17ª at the outer ends of said plates 17 and 18 are adapted to catch and engage the arms 8 when the seat is swung up, and a spring 25 acts to hold them so engaged. The front bar of the carrier is indicated at 24 (Fig. 6) to which the hinges 4 are attached.

In the use of the device the seat may be swung up or down as desired. In the latter position it is supported at the front end by the hinges and at the rear end by the springs 7 and arms 8, the latter resting on the brackets 11, and in this position may be used as an auxiliary seat for a second person to ride on the machine. When swung up, as shown in Figs. 4 and 5, the arms 8 swing upwardly and forwardly and when in proper upright position snap into the notches 17ª at the outer ends of the plates 17 and 18, the spring 25 yielding to permit this movement, and the seat will thus be so held to form a back to support the rider in the ordinary saddle of the machine. And in this position the carrier 5 is adapted to receive a package or other load which may be fastened thereon by any suitable means.

In the modified form shown in Figs. 7, 8 and 9 different means are provided for supporting the seat and for raising and lowering the same. In this construction, an arched frame 30 is provided, attached at its lower ends to the carrier frame 5, and this piece, in connection with the uprights 13, supports a pair of bars 29 to the front ends of which are hinged, at 32, the front ends of leaf springs 31, on the rear ends of which are mounted the frame 20 of the seat 2. Straps 27 are fastened to the front ends of the springs, on the underside thereof, and form guides for the ends of a crank 28 which turns in hinge or bearing pieces 26 fastened to the arch connecting the uprights 13, and this crank is extended at one end to form a lever handle 15ª which may be raised or lowered to swing the seat 2 up or down. The springs 31 are thus hung or supported by the hinge 32 and the crank 28 and so the rear ends of said springs are free to vibrate or yield to cushion the seat 2. By swinging the handle 15 forwardly the ends of the crank 28 slide down in the guides 27 and the seat drops to horizontal position. By swinging up the handle 15 the seat is raised as shown in Fig. 9, the ends of the crank 28 sliding to the upper ends of the guides 27, and said ends are located to form stops slightly beyond the center, so that the back is locked in raised position and will not fall down under pressure. When the seat is so raised it forms a back for the rider on the ordinary saddle, and also permits a load to be placed on the carrier 5 for the purpose of transportation. The back rest can be raised or lowered while the machine is in motion, by reaching back and throwing the lever 15ª. By lowering the back rest the rider can jump on or off easily, which would be different if the back rest were up.

The invention is not confined to the special forms shown, but is capable of modification in various respects within the scope thereof.

Having thus described my invention, what I claim as new, and desire to secure by Letters Patent is:—

1. An attachment for motor-cycles or the like, comprising a support adapted to be fastened to the frame of the vehicle, a carrier frame mounted on said support, a seat hinged to said frame and adapted to be swung up to form a back for the ordinary seat of the vehicle, and means to support said seat in raised position.

2. An attachment for motor-cycles or the like, comprising a support adapted to be fastened to the frame of the vehicle, a seat hinged to said support and adapted to be swung up to form a back, and means to hold said seat in raised position.

3. An attachment for motor-cycles or the like, comprising a carrier frame adapted to be attached to the frame of the vehicle, over the rear wheel thereof, an auxiliary seat hinged at its front end to the carrier frame and adapted to be swung up to form a back for the ordinary seat of the cycle, and means to support the auxiliary seat in either raised or lowered position.

4. An attachment for motor-cycles, or the like, comprising a supporting frame adapted to be fastened to the cycle, a carrier mounted on said frame, a seat pivotally mounted at one end on said frame, and adapted to be swung up or down over the carrier, and means including a spring to yieldingly support said seat in either position.

5. An attachment for motor-cycles or the like, comprising a supporting frame having uprights adapted to be attached to the rear part of the cycle frame, a carrier mounted on said support, for location over the rear wheel of the cycle, a seat hinged at its front end to said supporting frame and adapted to be swung down to position over said carrier or swung up to form a back for the ordinary seat of the cycle, and means to hold the seat in either raised or lowered position.

6. An attachment for motor-cycles or the like, comprising a supporting frame having uprights adapted to be attached to the rear part of the cycle frame, a carrier mounted on said support, for location over the rear wheel of the cycle, a seat hinged at its front end to said supporting frame and adapted to be swung down to position over said carrier or swung up to form a back for the ordinary seat of the cycle, and means including spring arms to hold the seat in either raised or lowered position.

7. An attachment for motor-cycles or the like, comprising a supporting frame adapted for attachment to the frame of the cycle, a carrier mounted on said frame, brackets projecting from said frame, a seat hinged to said frame and adapted to swing up or down over the carrier, spring supports for the seat resting on said brackets when the seat is lowered, and means to hold the seat in raised position when swung up.

In testimony whereof, I do affix my signature in presence of two witnesses.

ROY CHESTER BLACKMAN.

Witnesses:
JOHN A. BOMMHARDT,
STEDMAN J. ROCKWELL.